United States Patent
Ichiki et al.

(10) Patent No.: US 8,879,581 B2
(45) Date of Patent: Nov. 4, 2014

(54) DATA TRANSMITTING DEVICE AND DATA RECEIVING DEVICE

(75) Inventors: Atsushi Ichiki, Kawasaki (JP); Akira Nakagawa, Kawasaki (JP); Shunsuke Kobayashi, Fukuoka (JP); Kiyoshi Kohiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 831 days.

(21) Appl. No.: 13/064,636

(22) Filed: Apr. 5, 2011

(65) Prior Publication Data

US 2011/0182304 A1     Jul. 28, 2011

Related U.S. Application Data

(63) Continuation of application No. PCT/JP2008/069058, filed on Oct. 21, 2008.

(51) Int. Cl.
    *H04J 3/24*      (2006.01)
    *H04N 21/81*      (2011.01)

(52) U.S. Cl.
    CPC ......... *H04N 21/435* (2013.01); *H04N 21/8133* (2013.01); *H04N 21/235* (2013.01); *H04H 60/31* (2013.01); *H04N 21/26266* (2013.01); *H04N 21/4316* (2013.01); *H04N 21/643* (2013.01); *H04H 60/375* (2013.01); *H04N 21/2362* (2013.01); *H04N 20/16* (2013.01); *H04N 21/23614* (2013.01); *H04H 60/06* (2013.01); *H04H 20/40* (2013.01); *H04H 60/65* (2013.01); *H04N 21/4348* (2013.01); *H04N 21/812* (2013.01)
    USPC ........... 370/474; 370/469; 370/479; 370/432; 370/532; 370/533

(58) Field of Classification Search
    CPC ...................................................... H04N 5/775
    USPC .......... 370/474, 469, 479, 498, 432, 532, 535
    See application file for complete search history.

(56) References Cited

U.S. PATENT DOCUMENTS 6,040,867 A * 3/2000 Bando et al. ............. 375/240.27
6,381,254 B1 * 4/2002 Mori et al. ..................... 370/537

(Continued)

FOREIGN PATENT DOCUMENTS

| CN | 1833442 | 9/2006 |
|---|---|---|
| EP | 1 148 730 A2 | 10/2001 |

(Continued)

OTHER PUBLICATIONS

Chinese Office Action issued Oct. 24, 2012 in Chinese Patent Application No. 200880131622.0.

(Continued)

*Primary Examiner* — Andrew Lai
*Assistant Examiner* — Andrew C Lee
(74) *Attorney, Agent, or Firm* — Staas & Halsey LLP

(57) ABSTRACT

A data transmitting device transmits section information, a data broadcasting content, and a broadcasting content in a multiplexed manner. The data transmitting device includes a specified-information embedding unit that embeds information related to a specified image into the section information; a multiplexing unit that multiplexes the section information embedded with the specified information by the specified-information embedding unit, the data broadcasting content, and the broadcasting content; and a transmitting unit that transmits data multiplexed by the multiplexing unit to a data receiving device.

8 Claims, 13 Drawing Sheets

(51) Int. Cl.
*H04N 21/235* (2011.01)
*H04H 60/31* (2008.01)
*H04N 21/262* (2011.01)
*H04N 21/431* (2011.01)
*H04N 21/643* (2011.01)
*H04H 60/37* (2008.01)
*H04N 21/2362* (2011.01)
*H04H 20/16* (2008.01)
*H04N 21/236* (2011.01)
*H04H 60/06* (2008.01)
*H04H 20/40* (2008.01)
*H04N 21/435* (2011.01)
*H04H 60/65* (2008.01)
*H04N 21/434* (2011.01)

(56) References Cited

U.S. PATENT DOCUMENTS

| | | | |
|---|---|---|---|
| 6,611,812 B2* | 8/2003 | Hurtado et al. | 705/51 |
| 7,024,156 B2* | 4/2006 | Kawamata et al. | 455/3.02 |
| 7,043,746 B2* | 5/2006 | Ma | 725/22 |
| 7,464,394 B1* | 12/2008 | Gordon et al. | 725/54 |
| 7,551,672 B1* | 6/2009 | Tahara et al. | 375/240.01 |
| 8,281,332 B2* | 10/2012 | Rajaraman et al. | 725/32 |
| 2002/0078440 A1* | 6/2002 | Feinberg et al. | 725/9 |
| 2005/0034163 A1 | 2/2005 | Nakagawa et al. | |
| 2005/0210145 A1* | 9/2005 | Kim et al. | 709/231 |
| 2006/0053077 A1* | 3/2006 | Mourad et al. | 705/51 |
| 2006/0117341 A1* | 6/2006 | Park | 725/34 |
| 2007/0092202 A1 | 4/2007 | Kamimori | |
| 2008/0036757 A1* | 2/2008 | Furukawa et al. | 345/418 |
| 2008/0152300 A1* | 6/2008 | Knee et al. | 386/68 |
| 2009/0089837 A1* | 4/2009 | Momosaki | 725/40 |

FOREIGN PATENT DOCUMENTS

| | | |
|---|---|---|
| JP | 2001-016523 | 1/2001 |
| JP | 2001-036851 | 2/2001 |
| JP | 2001-266482 | 9/2001 |
| JP | 2002-320157 | 10/2002 |
| JP | 2007-116417 | 5/2007 |
| JP | 2007-274608 | 10/2007 |
| WO | WO03/005711 | 1/2003 |
| WO | 03/079690 A1 | 9/2003 |

OTHER PUBLICATIONS

"Digital Video Broadcasting (DVB); Specification for Service Information (SI) in DVB systems; European Broadcasting Union; ETSI EN 300 468", ETSI Standard, European Telecommunications Standards Institute (ETSI), Sophia Antipolis Cedex, France, vol. BC, No. V1.8.1, Jul. 1, 2008.

"Digital Video Broadcasting (DVB); DVB specification for data broadcasting; ETSI En 301 192", IEEE, LIS, Sophia Antipolis Cedex, France vol. BC No. V1.4.2, Apr. 1, 2008.

Extended European Search Report mailed on Jan. 28, 2013 in European Patent Application 08877537.4-2223/2339847.

International Search Report for PCT/JP2008/069058, mailed Jan. 13, 2009.

* cited by examiner

DATA TRANSMITTING DEVICE AND DATA RECEIVING DEVICE

CROSS_REFERENCE TO RELATED APPLICATION

This application is a continuation of International Application No. PCT/2008/069058, filed on Oct. 21, 2008, the entire contents of which are Incorporated herein by reference.

FIELD

The embodiment discussed herein are directed to a data transmitting device and a data receiving device.

BACKGROUND

In digital broadcasting (e.g., digital terrestrial broadcasting, etc.) of standards such as Association of Radio Industries and Businesses (ARIB), Advanced Television System Committee (ATSC), and Digital Video Broadcasting Project (DVB), a viewer can view programs only, skipping commercials (CMs). For example, a viewer skips a CM by switching to another channel during the CM time or fast-forwarding the CM during a replay. However, when the current business model is taken into consideration, if the viewers skip CMs, it is expected that sponsors stop funding for program production, which may result in a decrease in production of good programs.

For this reason, a technique is disclosed that causes a recorder/player to record whether a CM is displayed correctly and, if it is not displayed, prohibits the recorder/player from deleting the recorded program. Moreover, another technique is disclosed that allows, for example, a Video On Demand (VOD) system to insert CM-related information when a main program is transmitted. In this technique, a user terminal stores both the main program and the CM-related information in a storage unit. If a CM is skipped, the user terminal reads the CM-related information from the storage unit and displays both the main program and the CM-related information.

However, the above conventional technologies have a problem that, regarding digital broadcasting, a receiving side may fail to display specified information related to specified images. Regarding digital broadcasting, if for example, a viewer switches to another channel during a CM time in real time, the CM or the CM-related information is not displayed by the receiving side. In a situation where channels are switched in real time, the CM and the CM-related information that is inserted into the main program are not stored in the storage unit; therefore, the conventional technologies cannot solve the above problem.

The above problem will arise with not only information related to a CM. The same problem also arises with information provided for a viewer as a piece of information different from the main program, information that is likely to be skipped by a viewer, such as a sponsor introduction section of the program (screen labeled as "sponsored by"), an event announcement section of the program, scenes of a drama program where a sponsor product appears, and notification that the next program will start behind schedule because of the current program being extended, and some other specified information related to a specified image.

Patent Document 1: Japanese Laid-open Patent Publication No. 2001-266482

Patent Document 2: International Publication Pamphlet No. WO 2003/079690

SUMMARY

According to an aspect of an embodiment of the invention, a data transmitting device transmits section information, a data broadcasting content, and a broadcasting content in a multiplexed manner. The data transmitting device includes a specified-information embedding unit that embeds information related to a specified image into the section information; a multiplexing unit that multiplexes the section information embedded with the specified information by the specified-information embedding unit, the data broadcasting content, and the broadcasting content; and a transmitting unit that transmits data multiplexed by the multiplexing unit to a data receiving device.

According to another aspect of an embodiment of the invention, a data receiving device receives a stream in which section information, a data broadcasting content, and a broadcasting content are multiplexed and outputting the stream to an output unit. The data receiving device includes a detecting unit that detects whether output of a specified image that is included in the broadcasting content is avoided (skipped); and a specified-information output unit that searches for, when the detecting unit detects that output of the specified image is avoided (skipped), specified information embedded in the section information and outputs the found specified information to the output unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. A data transmitting device and a data receiving device according to a first embodiment are described below, first. After that, the outline of the data transmitting device, then the outline of the data receiving device, then the processing procedure by the data transmitting device, then the processing procedure by the data receiving device, and finally the effects of the first embodiment are described. Thereafter, another embodiment is described.

[a] First Embodiment

Outline of the data transmitting device and the data receiving device according to First Embodiment.

Figure 1:
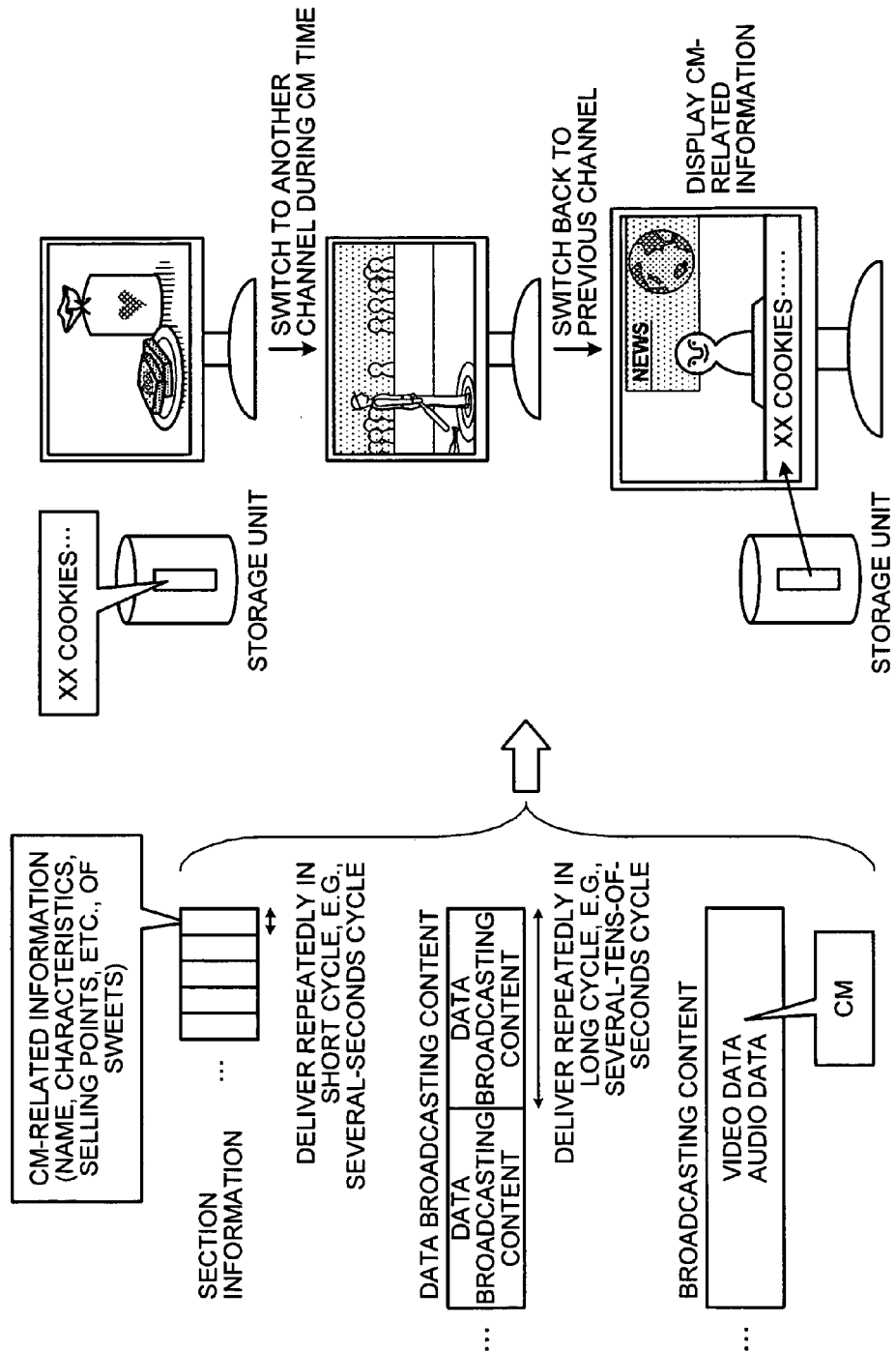
FIG. 1 is a schematic diagram that illustrates the outline of a data transmitting device and a data receiving device according to a first embodiment.

The outline of the data transmitting device and the data receiving device according to the first embodiment is described below with reference to FIG. 1. FIG. 1 is a schematic diagram that illustrates the outline of the data transmitting device and the data receiving device according to the first embodiment.

The data transmitting device according to the first embodiment transmits data for digital broadcasting with a stream conforming to Moving Picture Experts Group 2 (MPEG-2) Systems. More particularly, as illustrated in FIG. 1, the data transmitting device generates information about a broadcasting station, a program, etc., as section information (PSI: Program Specific Information and SI: Service Information) and transmits the section information, a data broadcasting content, and a broadcasting content that correspond to a main program in a multiplexed manner.

The data transmitting device transmits the data broadcasting content using a technique known as a data carousel. The data carousel is a method of transmitting a data broadcasting content repeatedly and its transmission cycle changes depending on the amount of the data broadcasting content. Because, in general, data that is transmitted as the data broadcasting content includes a data-rich content, such as image data, the data transmitting device repeatedly transmits the data broadcasting content repeatedly in a relatively long cycle (e.g., several minutes cycle).

The data transmitting device also transmits section information repeatedly. In contrast to the data broadcasting content, data that is transmitted as section information dose not include a data-rich content and the amount of data, in general, is small. Therefore, the data transmitting device transmits section information repeatedly in a relatively short cycle (e.g., several seconds cycle).

A broadcasting content that corresponds to a main program includes, in general, data something known as CM video data and audio data. However, for example as illustrated in FIG. 1, a viewer can skip the CM video data and audio data included in the broadcasting content by switching to another channel during the CM time.

To solve the problem, as illustrated in FIG. 1, the data transmitting device according to the first embodiment embeds CM-related information that is related to a CM into section information that is transmitted repeatedly in a cycle shorter than that of data broadcasting content. After that, the data transmitting device multiplexes the section data embedded with the CM-related information and the data broadcasting content and transmits them toward to the data receiving device. For example, CM-related information of CM for sweets contains the name of the sweets, the characteristics of the sweets, and the selling points of the sweets.

Even if a viewer switches to another channel during the CM time, the data receiving device receives at least the CM-related information embedded in the section information that is transmitted repeatedly in a short cycle and stores it in a storage unit. For example, as illustrated in FIG. 1, even if a viewer switches to another channel during the time of a CM for cookies, information related to the CM for cookies is stored in the storage unit.

After that, the data receiving device detects that the CM included in the broadcasting content is skipped, and it searches the section information for the CM-related information embedded therein. The data receiving device then displays the found CM-related information. For example, as illustrated in FIG. 1, when the viewer switches back to the previous channel, the data receiving device displays both the main program and the information related to the CM for cookies.

As described above, in the first embodiment, the data transmitting device embeds CM-related information in section information that is transmitted repeatedly in a short cycle; therefore, even if channels are switched during a CM, the data receiving device cannot fail to receive the CM-related information and can display it later. With this configuration, in the first embodiment, regarding digital broadcasting, the receiving side can display CM-related information in any situation.

Configuration of the Data Transmitting Device

Figure 2:
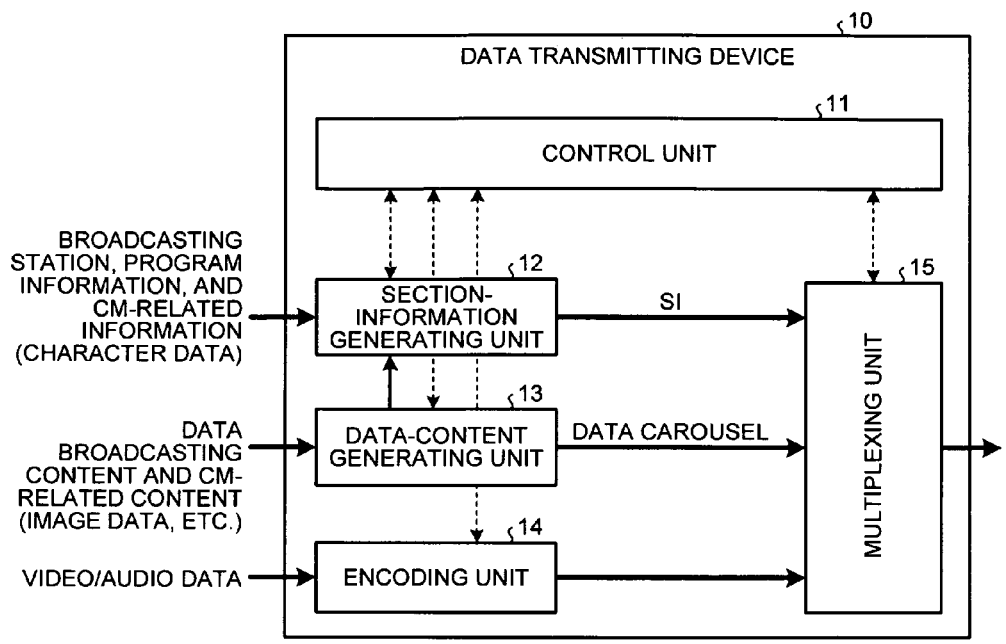
FIG. 2 is a block diagram of the configuration of the data transmitting device according to the first embodiment.

The configuration of the data transmitting device is described below with reference to FIG. 2 according to the first embodiment. FIG. 2 is a block diagram of the configuration of the data transmitting device according to the first embodiment.

As illustrated in FIG. 2, a data transmitting device 10 according to the first embodiment includes a control unit 11, a section-information generating unit 12, a data-content generating unit 13, an encoding unit 14, and a multiplexing unit 15.

The control unit 11 controls the data transmitting device 10. More particularly, the control unit 11 is connected to the section-information generating unit 12, the data-content generating unit 13, the encoding unit 14, and the multiplexing unit 15; it controls the section-information generating unit 12, the data-content generating unit 13, the encoding unit 14, and the multiplexing unit 15.

The section-information generating unit 12 generates not only information about a broadcasting station and a program but also section information embedded with CM-related information. More particularly, the section-information generating unit 12 is connected to the control unit 11, the data-content generating unit 13, and the multiplexing unit 15. The section-information generating unit 12 generates not only section information about a broadcasting station and a program from information received from outside but also section information from CM-related information that is received from outside and information received from the data-content generating unit 13. Moreover, the section-information generating unit 12 sends the generated section information to the multiplexing unit 15. It is noted that the CM-related information is information related to a CM and is made of character information indicating the outline of the CM. If, for example, a CM is for sweets, the CM-related information is information that contains the manufacture name of the sweets, the name of the sweets, the characteristics of the sweets, and the selling points of the sweets.

Figure 3:
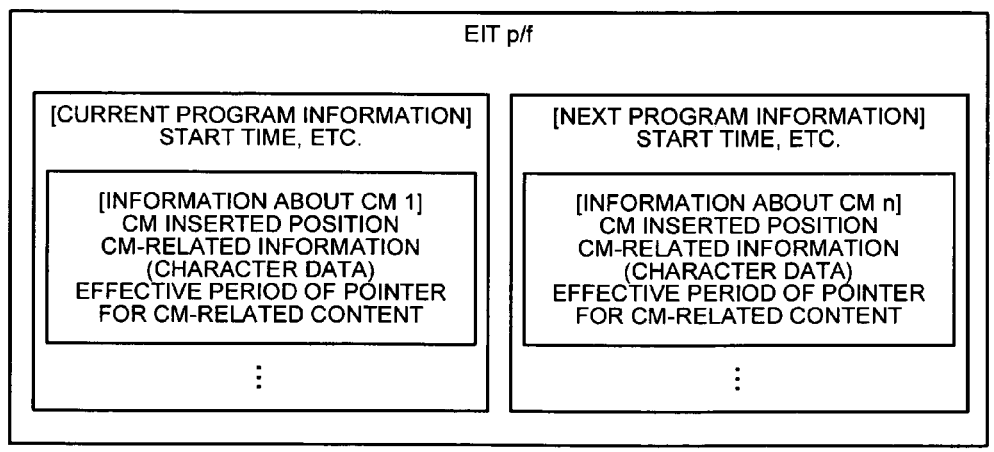
FIG. 3 is a schematic diagram that illustrates CM-related information inserted into section information.

The section-information generating unit 12 in the first embodiment inserts the CM-related information into an EIT (Event Information Table) as a descriptor (Descriptor). EITs specified by ARIB include an EIT [p/f] that contains information about the current program and information about the next program and an EIT [schedule] that contains information about programs of the week. The section-information generating unit 12 in the first embodiment, as illustrated in FIG. 3, inserts the CM-related information into an EIT [p/f]. FIG. 3 is a schematic diagram that illustrates the CM-related information inserted into the section information.

Figure 4:
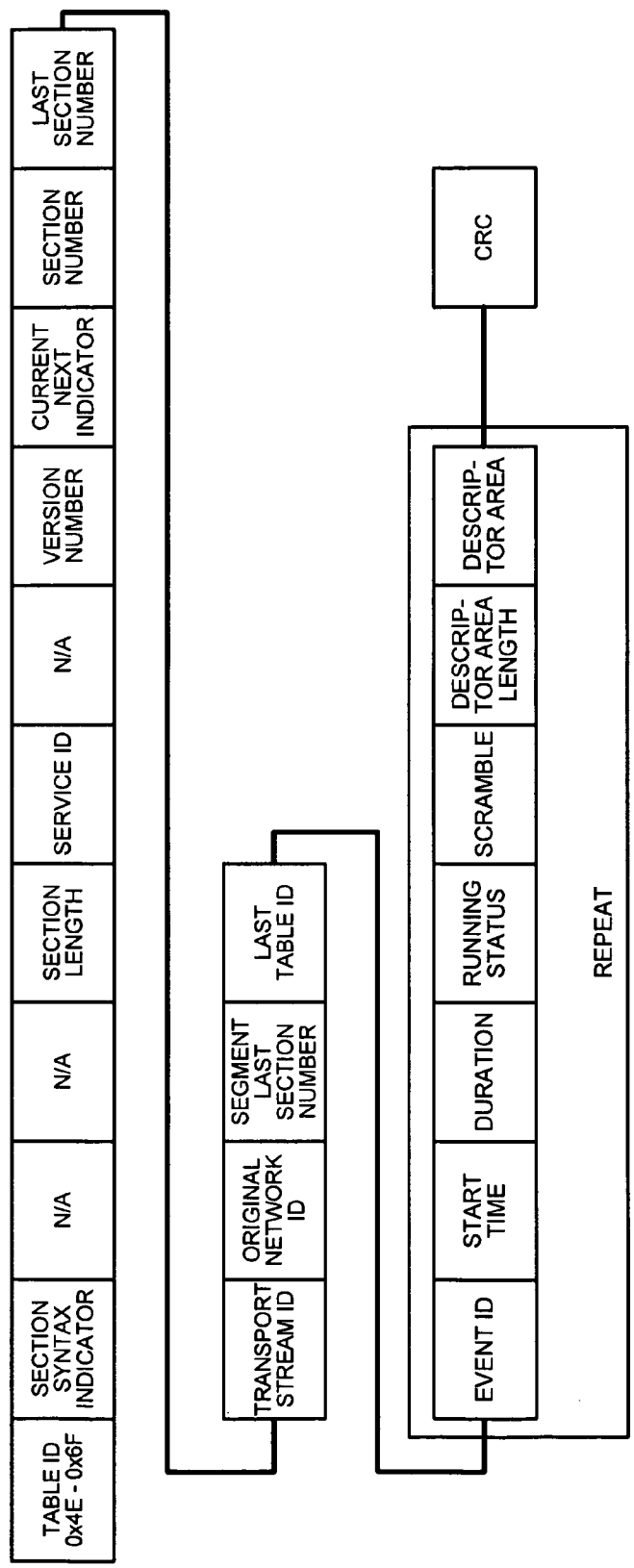
FIG. 4 is a schematic diagram of the structure of an EIT.
Figure 5:
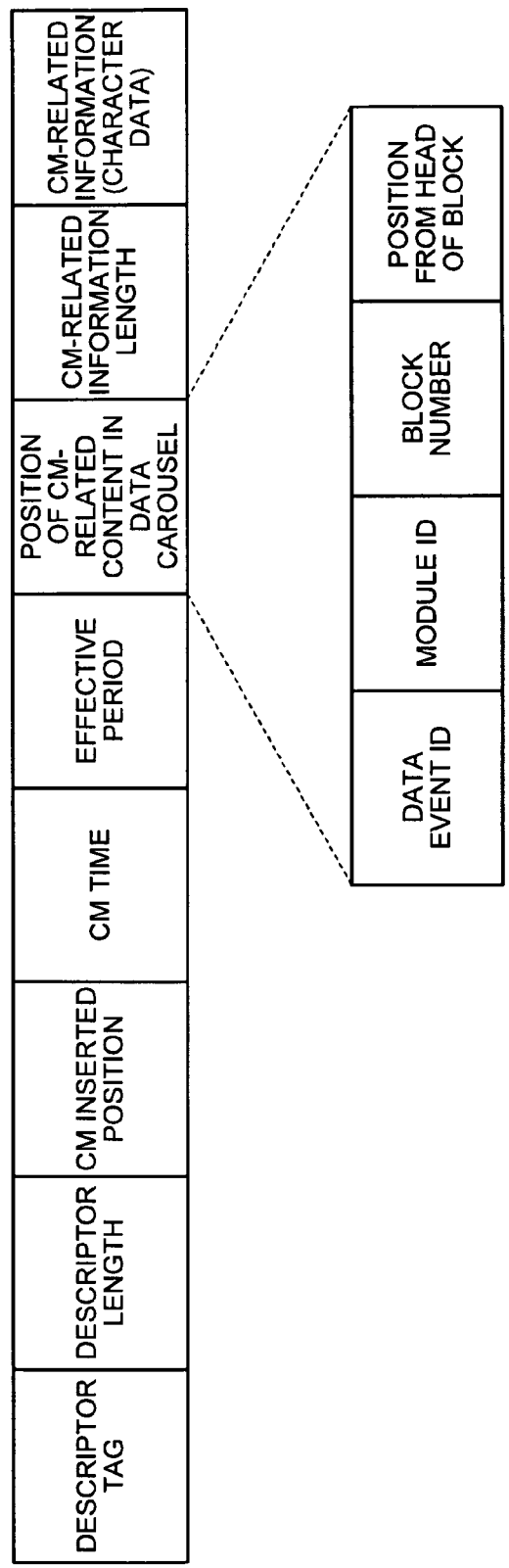
FIG. 5 is a schematic diagram of the structure of the CM-related information inserted into the EIT.

The CM-related information inserted into the section information is described in details below with reference to FIGS. 4 and 5. FIG. 4 is a schematic diagram of the structure of an EIT. As illustrated in FIG. 4, in the EIT, areas from "event ID" to "descriptor area (descriptor( ))" are defined to be areas for setting information related to one program. If information related to two or more programs are to be set, the areas from "event ID" to "descriptor area (descriptor( ))" are set repeatedly the same number of times as the number of the programs. Accordingly, in the EIT [p/f], the areas from "event ID" to "descriptor area (descriptor( ))" are set twice related to the current program and then the next program.

The section-information generating unit 12 in the first embodiment inserts the CM-related information into the "descriptor area (descriptor( ))". For example, as illustrated in FIG. 5, the section-information generating unit 12 inserts the CM-related information into the "descriptor area (descriptor( ))". FIG. 5 is a schematic diagram of the structure of the CM-related information inserted into the EIT.

The "descriptor tag" is the ID for identifying a descriptor. In the first embodiment, the descriptor tag is "0x60". The "descriptor length" indicates the length (byte) of a following descriptor. The "CM inserted position" is time (hrs/min/sec) indicating, if the program start time is 0, when a corresponding CM is inserted into the broadcasting content. The "CM time" indicates the length (min/sec) of a corresponding CM. The "effective period" is assumes the program beginning to be 0, and indicates the period (hrs/min/sec) when corresponding CM is effective. If CM skipping is detected by the data receiving device, within the effective period after the skipping, the data receiving device displays the CM-related content and the CM-related information.

The "position of the CM-related content in the data carousel" indicates the data event ID, the module ID, the block number, and the position from the head of the block that contains the CM-related content generated by the data-content generating unit 13. When the CM-related content is converted by the data-content generating unit 13 into a module and converted in the form of Digital Storage Media Command and Control (DSM-CC), the section-information generating unit 12 acquires information from the data-content generating unit 13. In other words, when a Download Information Indication (DII) message is generated by the data-content generating unit 13, the section-information generating unit 12 acquires the data event ID. Moreover, when a Download Data Block (DDB) message is generated by the data-content generating unit 13, the section-information generating unit 12 acquires the module ID, the block number, and the position from the head of the block.

The "CM-related information length" indicates the length (byte) of following CM-related information. The "CM-related information" is information related to a CM and is made of character information that contains the outline of the CM.

The data-content generating unit 13 generates a data broadcasting content that includes a CM-related content. More particularly, the data-content generating unit 13 is connected to the control unit 11, the section-information generating unit 12, and the multiplexing unit 15. Moreover, the data-content generating unit 13 generates not only normal data broadcasting content that is received from outside but also a data broadcasting content from a CM-related content that is received from outside. Moreover, the data-content generating unit 13 sends the generated data broadcasting content to the multiplexing unit 15. It is noted that the CM-related content is in the form of Broadcast Markup Language (BML) that includes not only character information but also still image data, dynamic image data, audio data, etc.

Figure 6:
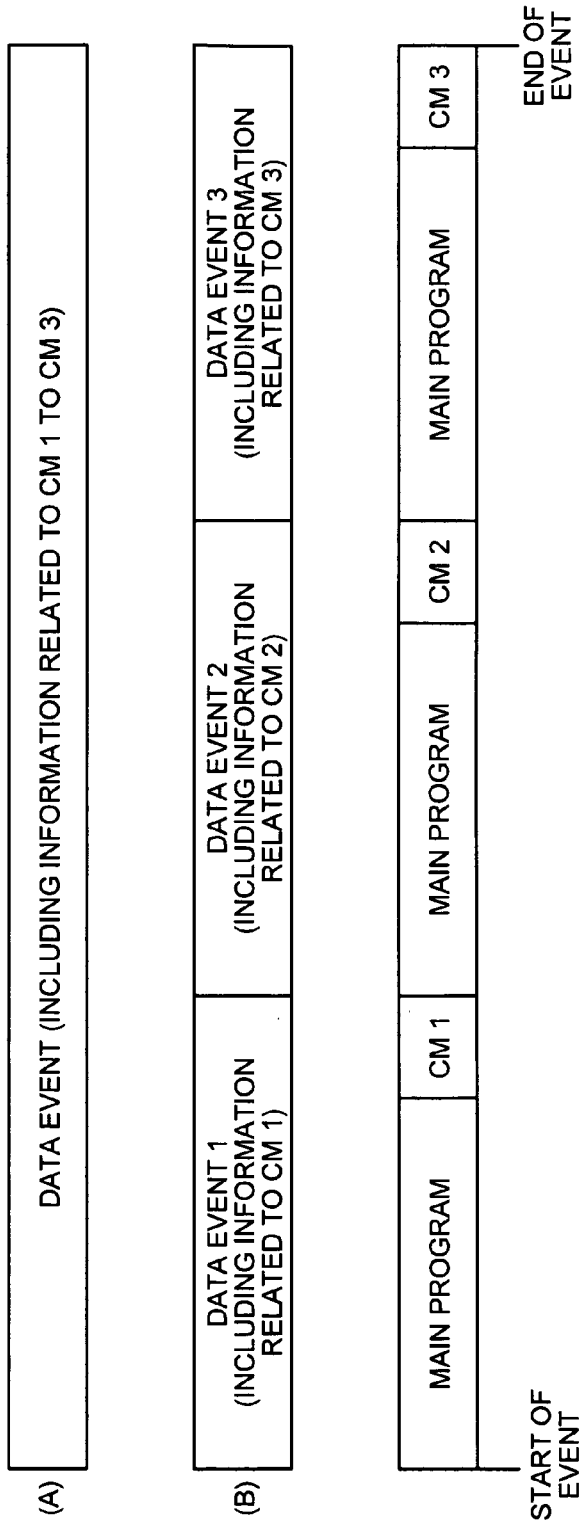
FIG. 6 is a schematic diagram that illustrates a data carousel.

The data-content generating unit 13 converts the CM-related content generated in the form of BML into modules each having the same size. When the data-content generating unit 13 generates modules, it arranges the CM-related content so as not to be included in two or more modules and generates a DDB message. During this process, the module ID, the block number, and the position from the head of the block of the CM-related content that is inserted into the EIT [p/f] are decided and sent from the data-content generating unit 13 to the section-information generating unit 12. After that, the data-content generating unit 13 makes up data in the form known as "data event" together with the other data broadcasting content, thereby generating a DII message. During this process, the data event ID of the CM-related content that is inserted into the EIT [p/f] is decided and sent from the data-content generating unit 13 to the section-information generating unit 12. It is noted that the data event indicates an area of data to be sent at a single data carousel. As illustrated in (A) of FIG. 6, it can be in the form of one data event for each program, or, as illustrated in (B), it can be in the form of data event separated by the end of each CM. The amount of data of (A) of FIG. 6 is larger than that of (B) of FIG. 6 and, therefore, the data transmission cycle of (A) is longer than that of (B).

Figure 7:
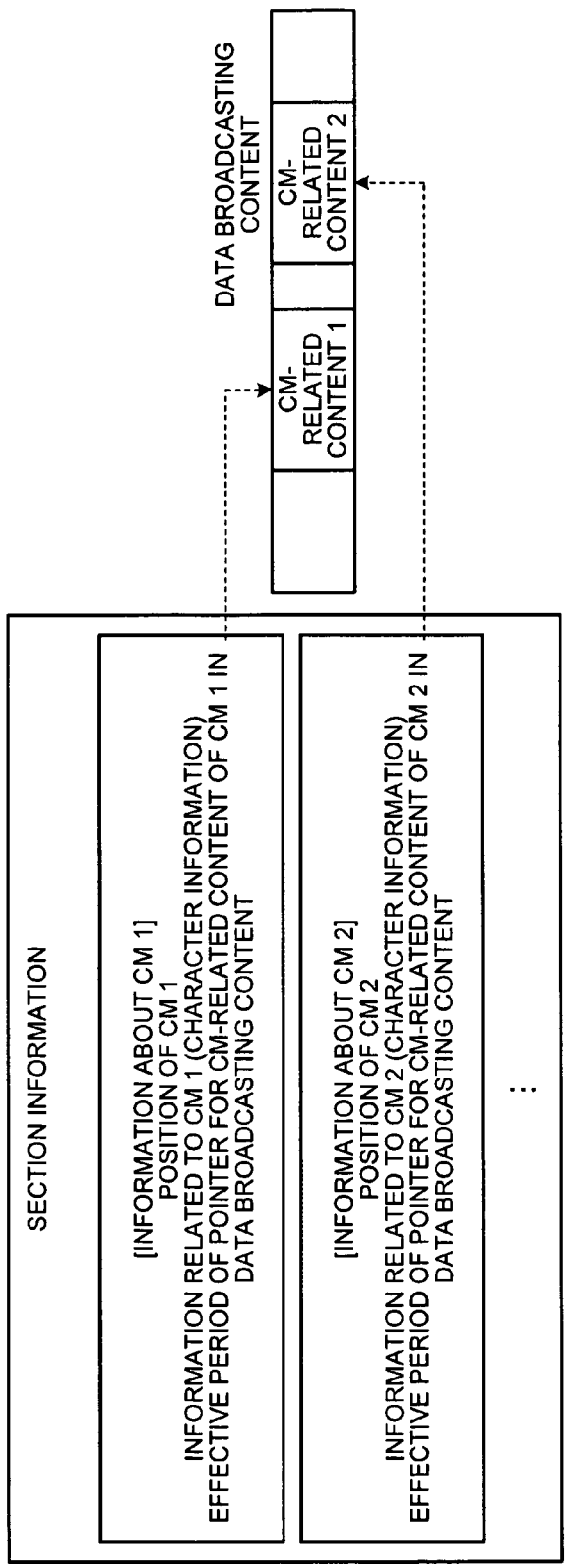
FIG. 7 is a schematic diagram that a relation between section information and data broadcasting content.

As illustrated in FIG. 7, a pointer for the CM-related content that is included in the data broadcasting content generated by the data-content generating unit 13 is thus created in the CM-related information that is included in the section information generated by the section-information generating unit 12.

The encoding unit 14 encodes video data and audio data of the main program. More particularly, the encoding unit 14 is connected to the control unit 11 and the multiplexing unit 15. Moreover, the encoding unit 14 encodes video data and audio data that are received from outside and sends the encoded data to the multiplexing unit 15. If the encoded video data and audio data are received, the encoding unit 14 is not needed.

The multiplexing unit 15 multiplexes generated data and encoded data in the form of MPEG-2 Systems and then transmits the multiplexed data. More particularly, the multiplexing unit 15 multiplexes the section information received from the section-information generating unit 12, the data broadcasting content received from the data-content generating unit 13, and the encoded data received from the encoding unit 14 and then transmits the multiplexed data.

During this process, when the multiplexing unit 15 transmits section information with a low amount of data, it transmits each piece of section information repeatedly in a short cycle, for example, a cycle of several seconds. When the multiplexing unit 15 transmits a data broadcasting content with a high amount of data, it transmits each data event repeatedly in a long cycle, for example, a cycle of several minutes.

Configuration of the Data Receiving Device

Figure 8:
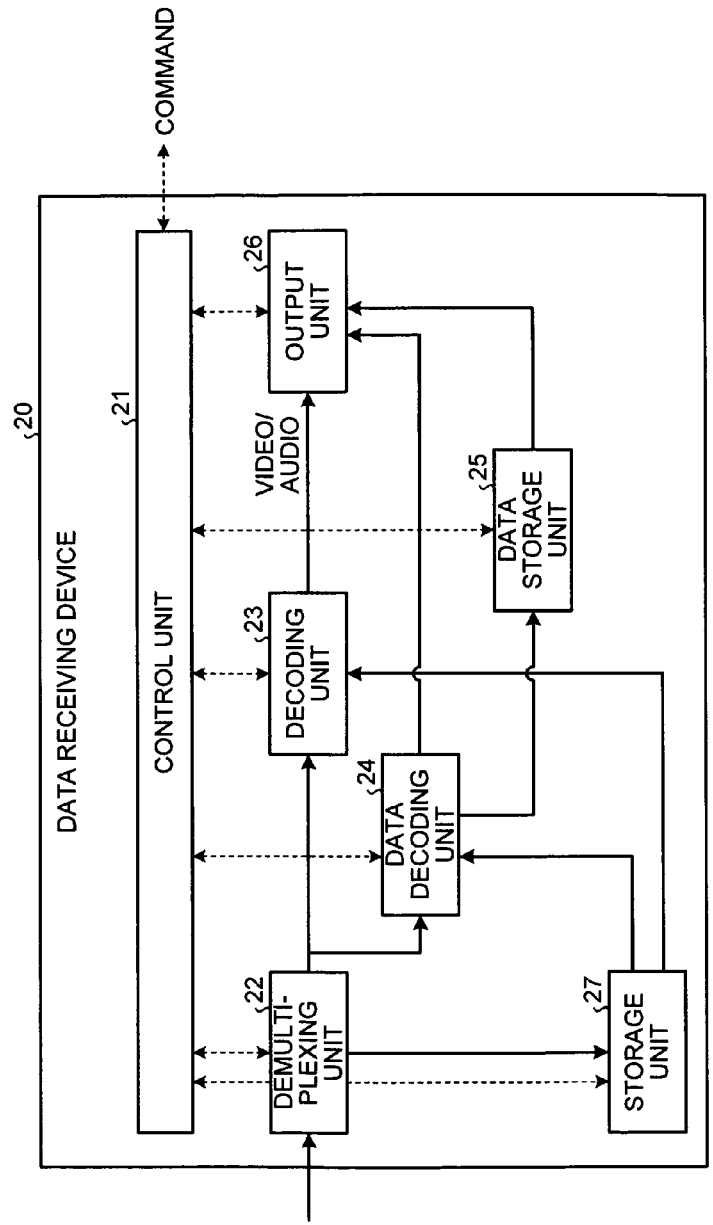
FIG. 8 is a block diagram of the configuration of the data receiving device according to the first embodiment.

The configuration of the data receiving device is described below with reference to FIG. 8 according to the first embodiment. FIG. 8 is a block diagram of the configuration of the data receiving device according to the first embodiment.

As illustrated in FIG. 8, in the first embodiment, a data receiving device 20 includes a control unit 21, a demultiplexing unit 22, a decoding unit 23, a data decoding unit 24, a data storage unit 25, an output unit 26, and a storage unit 27.

The control unit 21 controls the data receiving device 20. More particularly, the control unit 21 is connected to the demultiplexing unit 22, the decoding unit 23, the data decoding unit 24, the data storage unit 25, the output unit 26, and the storage unit 27. Moreover, the control unit 21 controls the demultiplexing unit 22, the decoding unit 23, the data decoding unit 24, the data storage unit 25, the output unit 26, and the storage unit 27. It is noted that when, for example, a remote controller or the like is pressed by a viewer, the control unit 21 determines whether a fast-forwarding command is received and whether a channel selection command is received and then causes the output unit 21 to perform output processing in accordance with the determination.

The demultiplexing unit 22 receives a stream and then demultiplexes the received stream. More particularly, the demultiplexing unit 22 is connected to the control unit 21, the decoding unit 23, the data decoding unit 24, and the storage unit 27. Moreover, after the demultiplexing unit 22 demultiplexes the received stream, it sends the encoded video data and audio data to the decoding unit 23 and the storage unit 27 and sends the data broadcasting content and the section information to the data decoding unit 24.

The decoding unit 23 decodes video data and audio data. More particularly, the decoding unit 23 is connected to the control unit 21, the demultiplexing unit 22, the output unit 26, and the storage unit 27. Moreover, the decoding unit 23 decodes the encoded data that is received from the demultiplexing unit 22 and the encoded data that is stored in the storage unit 27 and then sends the decoded video data and audio data to the output unit 26.

The data decoding unit 24 decodes the data broadcasting content and section information. More particularly, the data decoding unit 24 is connected to the demultiplexing unit 22, the data storage unit 25, and the output unit 26. Moreover, the data decoding unit 24 decodes the data broadcasting content and the section information that are received from the demultiplexing unit 22 and then outputs the program information, etc., that is included in the decoded data broadcasting content and the decoded section information to the output unit 26 and the data storage unit 25.

The data storage unit 25 stores therein the decoded data broadcasting content and decoded section information as temporal data. More particularly, the data storage unit 25 is connected to the control unit 21, the data decoding unit 24, and the output unit 26 and it stores therein the data broadcasting content and the section information that are received from the data decoding unit 24 as temporal data and then sends data to the output unit 26 in accordance with output processing by the output unit 26.

The storage unit 27 stores therein received streams. More particularly, the storage unit 27 is connected to the control unit 21, the demultiplexing unit 22, the decoding unit 23, and the data decoding unit 24. The storage unit 27 stores therein the stream that is received from the demultiplexing unit 22 and then sends it to the decoding unit 23 and the data decoding unit 24 in accordance with output processing by the output unit 26.

The output unit 26 outputs data, such as the decoded data broadcasting content and the program information that is included in the decoded section information, and the decoded video data and audio data, together. More particularly, the output unit 26 is connected to the control unit 21, the decoding unit 23, the data decoding unit 24, and the data storage unit 25. Moreover, the output unit 26 outputs data, such as the data broadcasting content that is decoded by the data decoding unit 24 and the program information that is included in the section information, and the video data and audio data that are decoded by the decoding unit 23, together. Moreover, the output unit 26 outputs data, such as the CM-related content that is included in the data broadcasting content that is stored in the data storage unit 25 and the CM-related information that is included in the section information, and the video data and audio data that are decoded by the decoding unit 23, together.

Figure 9:
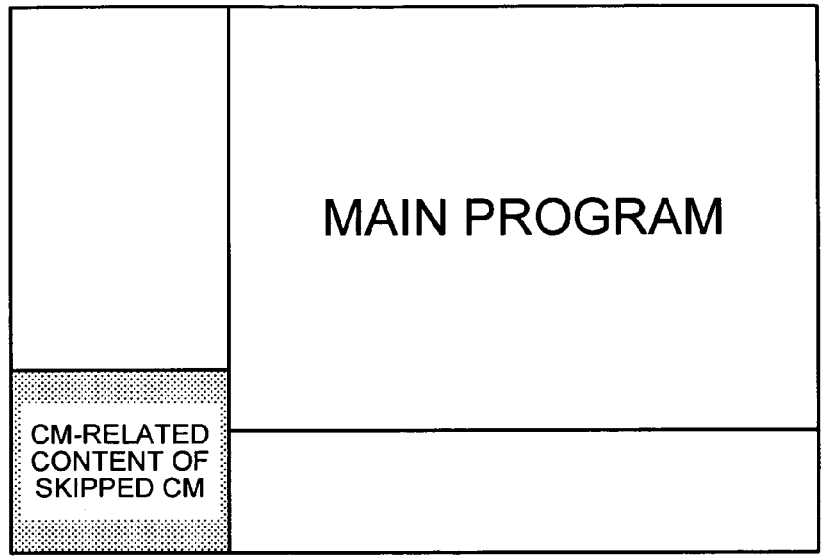
FIG. 9 is a schematic diagram that illustrates how to display the CM-related content included in the data carousel.
Figure 10:
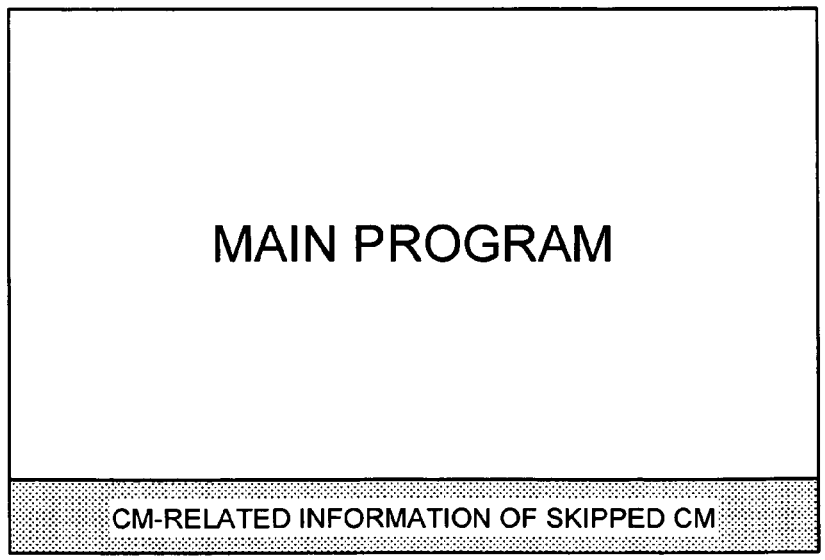
FIG. 10 is a schematic diagram that illustrates how to display the CM-related information included in the EIT.

In the first embodiment, the output unit 26 outputs data, such as the CM-related content that is included in decoded data broadcasting content and the CM-related information that is included in the section information, and the decoded video data and audio data in such a manner illustrated in FIGS. 9 and 10. The output unit 26 outputs the CM-related content included in the data broadcasting content in, for example, a manner illustrated in FIG. 9 and outputs the CM-related information included in the section information in, for example, a manner illustrated in FIG. 10.

Moreover, in the first embodiment, when channels are switched during a CM time or a CM is fast-forward during a replay, the output unit 26 outputs, under the control of the control unit 21, at least the CM-related information that is included in the section information. This process will be described in details later in the section of the processing procedure by the data receiving device according to the first embodiment.

Processing Procedure by the Data Transmitting Device

Figure 11:
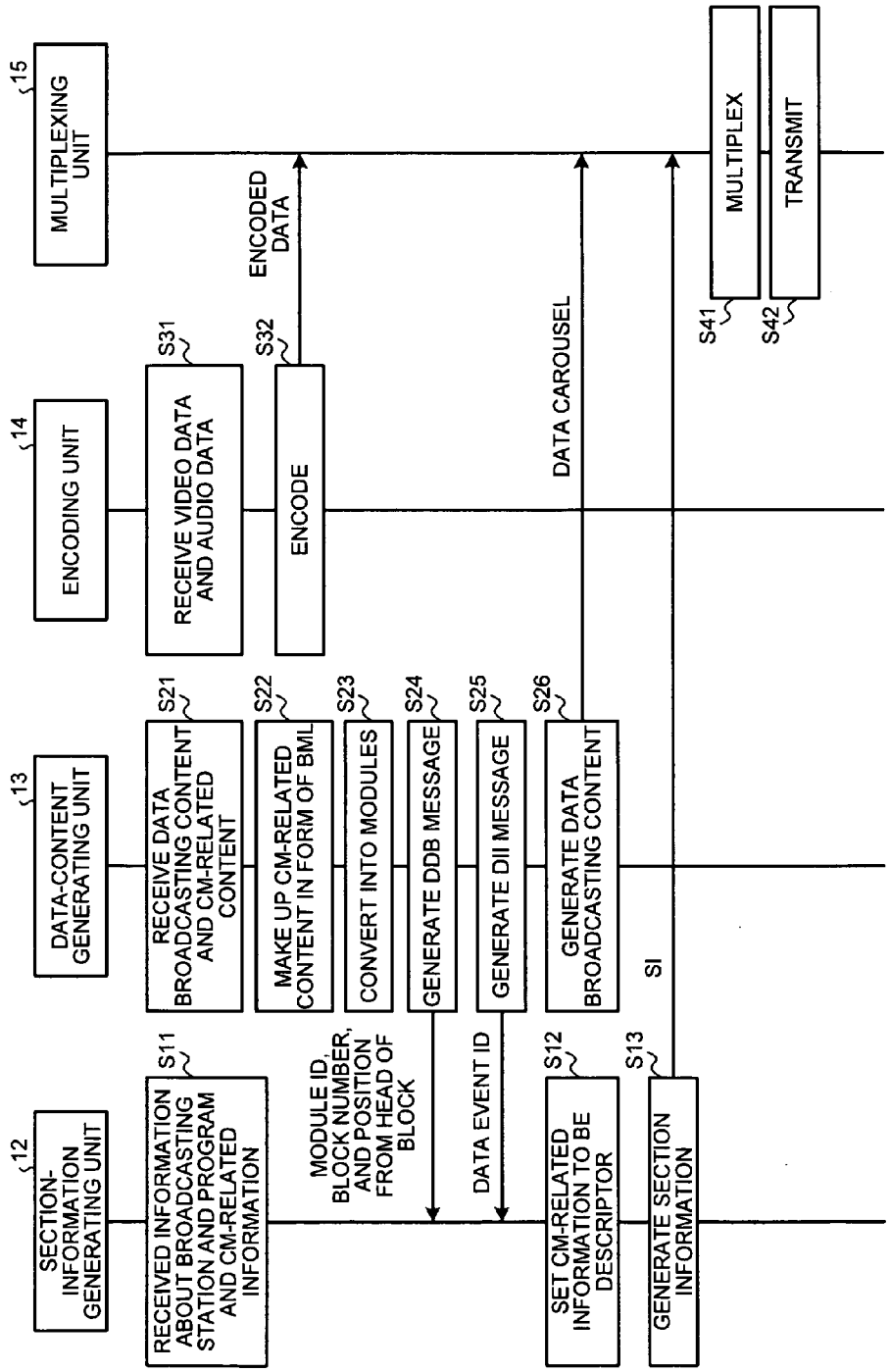
FIG. 11 is a sequence diagram of a processing procedure by the data transmitting device according to the first embodiment.

The processing procedure by the data transmitting device is described below with reference to FIG. 11 according to the first embodiment. FIG. 11 is a sequence diagram of the processing procedure by the data transmitting device according to the first embodiment.

As illustrated in FIG. 11, in the data transmitting device 10, the section-information generating unit 12 receives information about, for example, a broadcasting station and a program and CM-related information from outside (Step S11).

After that, the section-information generating unit 12 waits for the module ID, the block number, the position from the head of the block, and the data event ID being received from the data-content generating unit 13 and sets the CM-related information to a descriptor of section information (Step S12).

The section-information generating unit 12 then generates section information (Step S13) and sends it to the multiplexing unit 15.

Moreover, as illustrated in FIG. 11, in the data transmitting device 10, the data-content generating unit 13 receives a data broadcasting content and a CM-related content from outside (Step S21).

After that, the data-content generating unit 13 makes up the CM-related content in the form of BML (Step S22), and converts it to modules (Step S23). The data-content generating unit 13 then generates a DDB message (Step S24), sends the module ID, the block number, and the position from the head of the block to the section-information generating unit 12. Moreover, the data-content generating unit 13 generates a DII message (Step S25), and sends the data event ID to the section-information generating unit 12.

After that, the data-content generating unit 13 generates a data broadcasting content (Step S26), and sends them to the multiplexing unit 15.

Moreover, as illustrated in FIG. 11, in the data transmitting device 10, the encoding unit 14 receives video data and audio data from outside (Step S31), encodes then (Step S32), and sends them to the multiplexing unit 15.

Moreover, as illustrated in FIG. 11, in the data transmitting device 10, the multiplexing unit 15 receives the encoded data from the encoding unit 14, the data broadcasting content from the data-content generating unit 13, and the section information from the section-information generating unit 12. The multiplexing unit 15 then multiplexes these data (Step S41), and transmits them (Step S42).

Processing Procedure by the Data Receiving Device

Figure 12:
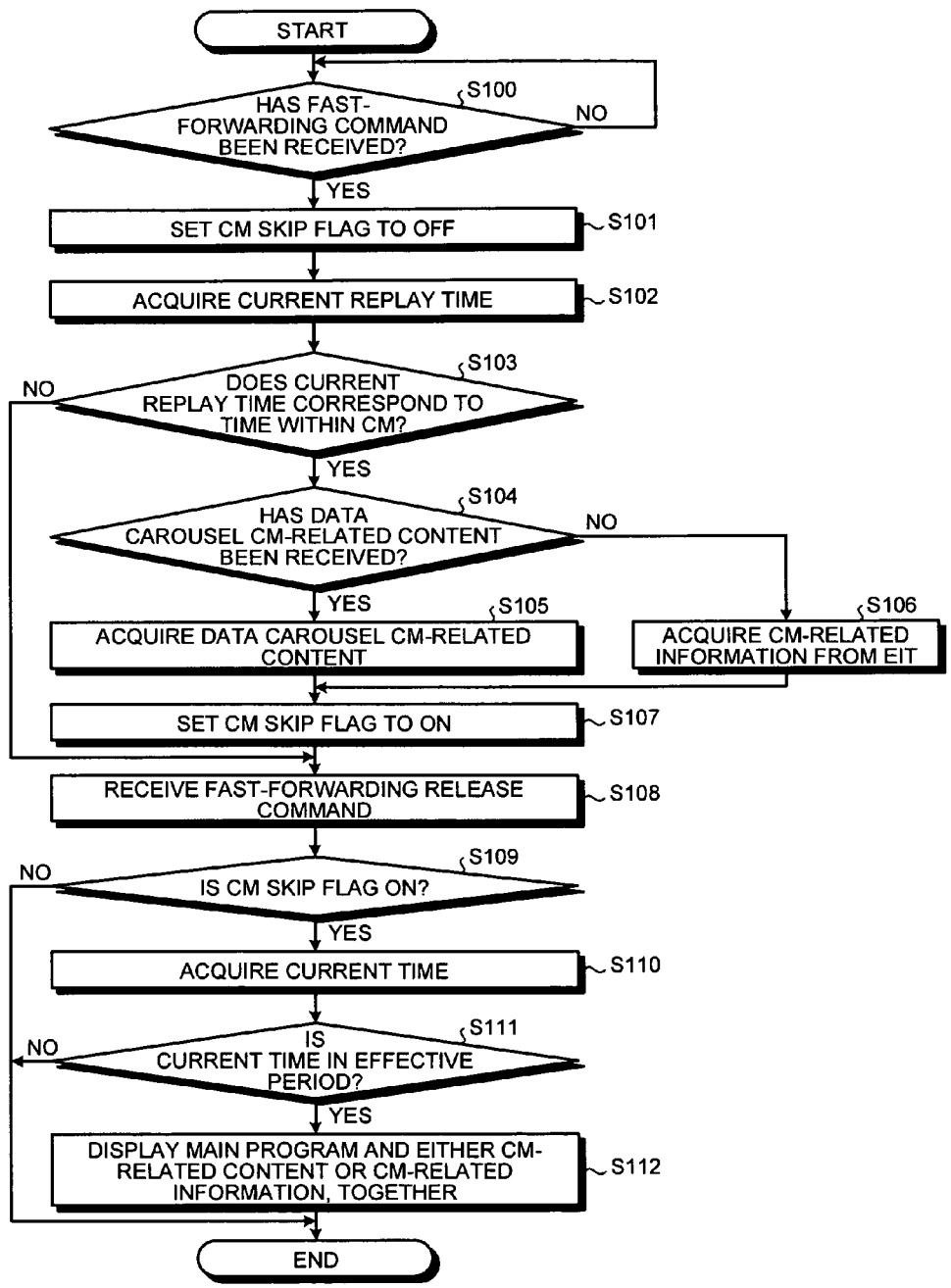
FIG. 12 is a flowchart of a processing procedure by the data receiving device according to the first embodiment.
Figure 13:
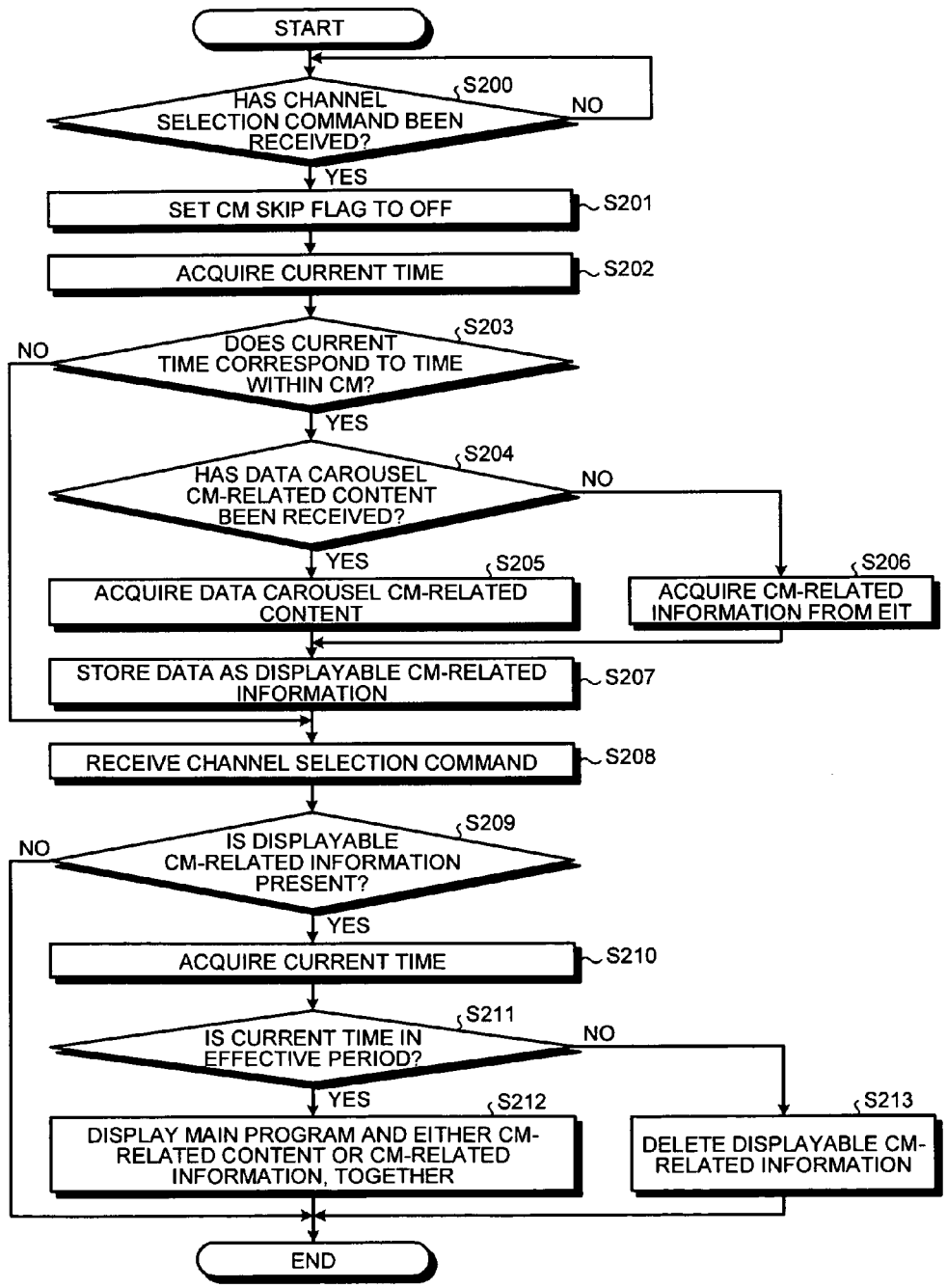
FIG. 13 is a flowchart of a processing procedure by the data receiving device according to the first embodiment.

The processing procedure by the data receiving device is described below with reference to FIGS. 12 and 13 according to the first embodiment. FIGS. 12 and 13 are flowcharts of the processing procedure by the data receiving device according to the first embodiment.

The processing procedure that is performed when a CM is fast-forward during a replay is described below with reference to FIG. 12. It is noted that the data receiving device 20 separates a stream received from the data transmitting device 10 by the demultiplexing unit 22 and then stores them in the storage unit 27. During a replay, the data receiving device 20 decodes, by the data decoding unit 24, the data broadcasting content and the section information that are stored in the storage unit 27 (separates BML, etc.) and stores the data in the data storage unit 25 until the end of the replaying program. The output unit 26 then outputs data, such as the CM-related content that is included in the data broadcasting content stored in the data storage unit 25 and the CM-related information included in the section information, and the video data and audio data that are decoded by the decoding unit 23, together.

As illustrated in FIG. 12, in the data receiving device 20, when the remote controller is pressed by a viewer, the control unit 21 determines whether a fast-forwarding command is received (Step S100). When a fast-forwarding command is received (Yes at Step S100), the control unit 21 sets a CM skip flag to OFF, thereby initializing it (Step S101).

After that, the control unit 21 acquires the current replay time (Step S102). More particularly, the control unit 21 refers to the section information stored in the data storage unit 25 and acquires the current replay time using the "start time" contained in the EIT [p/f] and the replay time that is under the management of the control unit 21.

The control unit 21 then determines whether the current replay time corresponds to a time within a CM (Step S103). More particularly, the control unit 21 refers to the section information stored in the data storage unit 25, compares the "CM inserted position" and the "CM time" contained in the EIT [p/f] with the current replay time, and determines whether the current replay time corresponds to a time within a CM.

If the current replay time corresponds to a time within a CM (Yes at Step S103), the control unit 21 determines whether a data carousel CM-related content has been received (Step S104). More particularly, the control unit 21 refers to the section information stored in the data storage unit 25, searches, by using the "position of the CM-related content in data carousel" contained in the EIT [p/f], for a data broadcasting content that is present in the data storage unit 25.

If a CM-related content is present in the data storage unit 25 (Yes at Step S104), the control unit 21 acquires the CM-related content from the data storage unit 25 (Step S105). On the other hand, if a CM-related content is not present in the data storage unit 25 (No at Step S104), the control unit 21 searches the data storage unit 25 for CM-related information contained in the EIT [p/f] and acquires it (Step S106). After that, the control unit 21 sets the CM skip flag to ON (Step S107).

If, at Step S103, the current replay time does not correspond to a time within a CM (No at Step S103) or after Step S107, the control unit 21 receives a fast-forwarding release command (Step S108). The control unit 21 then determines whether the CM skip flag is ON (Step S109). If it is not ON (No at Step S109), the process control goes to end.

On the other hand, If it is ON (Yes at Step S109), because this means that a CM is skipped, the control unit 21 acquires the current time (Step S110). More particularly, the control unit 21 acquires the current time by using the time acquired at Step S102 and the fast-forwarding time that is under the management of the control unit 21.

The control unit 21 then determines whether the current time is in an effective period (Step S111). More particularly, the control unit 21 refers to the section information stored in the data storage unit 25, compares the "effective period" contained in the EIT [p/f] with the current time, and determines whether the current time is in the effective period.

If it is not in the effective period (No at Step S111), the control unit 21 completes the process. On the other hand, if it is in the effective period (Yes at Step S111), the control unit 21 causes the output unit 26 to output the main program and either the CM-related content or the CM-related information (Step S112), and the process control goes to end.

The processing procedure that is performed when channels are switched during a CM time is described below with reference to FIG. 13. It is noted that the data receiving device 20 separates a stream received from the data transmitting device 10 by the demultiplexing unit 22, then decodes the data broadcasting content and the section information by the data decoding unit 24, and then stores data in the data storage unit 25 until the end of the replaying program. After that, the output unit 26 outputs data, such as the CM-related content that is included in the data broadcasting content that is stored in the data storage unit 25 and the CM-related information that is included in the section information, and the video data and audio data decoded by the decoding unit 23, together.

As illustrated in FIG. 13, in the data receiving device 20, when the remote controller is pressed by a viewer, the control unit 21 determines whether a channel selection command is received (Step S200). When a channel selection command is received (Yes at Step S200), the control unit 21 sets the CM skip flag to OFF, thereby initializing it (Step S201).

After that, in the same manner as the process during a replay, the control unit 21 acquires the current replay time (Step S202) and determines whether the current replay time corresponds to a time within a CM (Step S203). If the current replay time corresponds to a time within a CM (Yes at Step S203), in the same manner as the process during a replay, the control unit 21 determines whether a data carousel CM-related content has been received (Step S204). If a CM-related content is present in the data storage unit 25 (Yes at Step S204), the control unit 21 acquires the CM-related content from the data storage unit 25 (Step S205).

On the other hand, if a CM-related content is not present in the data storage unit 25 (No at Step S204), in the same manner as the process during a replay, the control unit 21 searches the data storage unit 25 for CM-related information that is present in the EIT [p/f] and then acquires it (Step S206).

After that, when channels are switched, the control unit 21 stores the channel number and its effective period and either the CM-related content or the CM-related information in a storage unit that stores as displayable CM-related information (Step S207). More particularly, the control unit 21 stores the channel number that is used to identify the channel that is selected before the channel selection command is received at Step S200. Moreover, the control unit 21 refers to the section information stored in the data storage unit 25 and stores the "effective period" contained in the EIT [p/f]. Moreover, the control unit 21 stores the CM-related content that is acquired at Step S205 or the CM-related information that is acquired at Step S206.

If, at Step S203, the current replay time does not correspond to a time within a CM (No at Step S203), or after Step S207, the control unit 21 receives a channel selection command (Step S208). The control unit 21 then determines whether the selected channel indicated by the received channel selection command is a channel present in the storage unit that stores therein the displayable CM-related information (Step S209). If the channel is not present (No at Step S209), the process control goes to end.

On the other hand, if the channel is present (Yes at Step S209), because it means that the viewer switches channels during a CM, the control unit 21 acquires the current time (Step S210). The control unit 21 then refers to the effective period that is stored in the storage unit that stores as the displayable CM-related information and determines whether the current time is in the effective period (Step S211). If it is not in the effective period (No at Step S211), the control unit 21 deletes information from the storage unit that stores as the displayable CM-related information (Step S213), and the process control goes to end.

On the other hand, if it is in the effective period (Yes at Step S211), the control unit 21 causes the output unit 26 to output the main program and either the CM-related content or the CM-related information, together (Step S212), and the process control goes to end.

Effects of First Embodiment

As described above, in the first embodiment, the data transmitting device embeds CM-related information in section information that is transmitted repeatedly in a shorter cycle than that of the data broadcasting content. The data transmitting device then transmits the section information embedded with the CM-related information, the data broadcasting content, and the broadcasting content to the data receiving device in a multiplexed manner.

On the other hand, in the first embodiment, when the data receiving device detects that output of a CM that is included in the broadcasting content is avoided (skipped), it searches for the CM-related information embedded in the section information and outputs the found CM-related information to the output unit.

As described above, in first embodiment, the data transmitting device embeds CM-related information in section information that is transmitted repeatedly in a short cycle; therefore, even if, for example, channels are switched during a CM, the data receiving device does not fail to receive the CM-related information and can display it later. As described above, in the first embodiment, regarding digital broadcasting, the receiving side can display the CM-related information in any situation.

Moreover, in the first embodiment, the data transmitting device embeds a CM-related content in a data broadcasting content, in which the amount of the CM-related content is larger than that of the CM-related information. When, in the first embodiment, the data receiving device detects that output of a CM is avoided (skipped), it searches for the CM-related content embedded in the data broadcasting content, first. If no CM-related content is found, the data receiving device then searches for the CM-related information embedded in the section information and outputs it to the output unit.

As described above, in the first embodiment, when the CM-related content has been received, the data receiving device can display the CM-related content preferentially selected.

[b] Other Embodiments

Although the first embodiment of the present invention is described in the above, the present invention is not limited to the above embodiment and can be embodied variously.

Specified Information

In the first embodiment, the specified information is, for example, information related to a CM for sweets and, more particularly, the name of the manufacture that produces the sweets, the name of the sweets, the characteristics of the sweets, and its selling points. However, in the present invention, it is not limited thereto. The specified information used in the present invention is not limited to product advertising CMs but a concept that includes information provided for viewers as information different from the main program and information that is likely to be skipped by viewers. For example, it includes a sponsor introduction section of the program (screen labeled as "sponsored by"), an event announcement section of the program, scenes of a drama program or the like where a sponsor product appears, and notification that the next program will start behind schedule because of the current program being extended, etc.

Insertion of CM-Related Information, CM-Related Content

Moreover, although the technique described in the first embodiment teaches that CM-related information is inserted into an EIT [p/f] and a CM-related content is generated in the form of BML, the present invention is not limited thereto. The CM-related information can be inserted into an EIT [schedule] and a CM-related content can be generated in the form of Multimedia Home Platform (MHP).

Moreover, the technology described in the first embodiment teaches that not only CM-related information is inserted into section information but also a CM-related content is inserted into a data broadcasting content. Therefore, the data receiving device searches for the CM-related content, first. If the CM-related content has been received, the main program and the CM-related content preferentially selected are displayed, together. The present invention is not limited thereto. For example, it is unnecessary to insert the CM-related content into the data broadcasting content. In this case, the data receiving device promptly searches for CM-related information without searching a CM-related content and displays the main program and the CM-related information, together.

System Configuration, Etc.

Of the processes described in the embodiments, all or part of the processes explained as being performed automatically can be performed manually. Similarly, all or part of the processes explained as being performed manually can be performed automatically by a known method. The processing procedures (FIGS. 11 to 13, etc.), specific names, various data, and information including parameters described in the embodiments or illustrated in the drawings can be changed as required unless otherwise specified.

The components of the devices illustrated in the drawings are merely conceptual, and need not be physically configured as illustrated (in FIGS. 2 and 8, etc). The components, as a whole or in part, can be separated or integrated either functionally or physically based on various types of loads or use conditions. The process functions performed by the devices are entirely or partially realized by a central processing unit (CPU) and programs that are analyzed and executed by the CPU, or realized as hardware by wired logic.

Data Transmitting Program And Data Receiving Program

Figure 14:
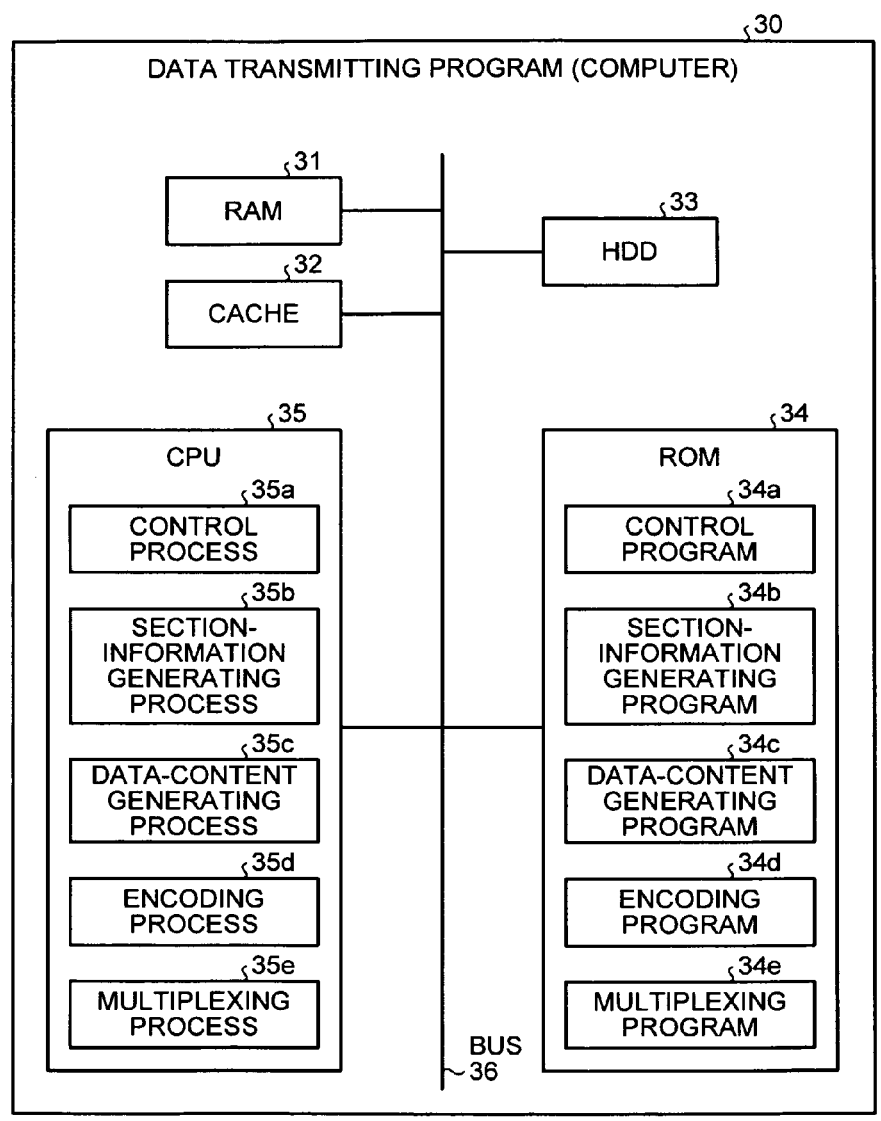
FIG. 14 is a diagram of a computer that executes a data transmitting program.
Figure 15:
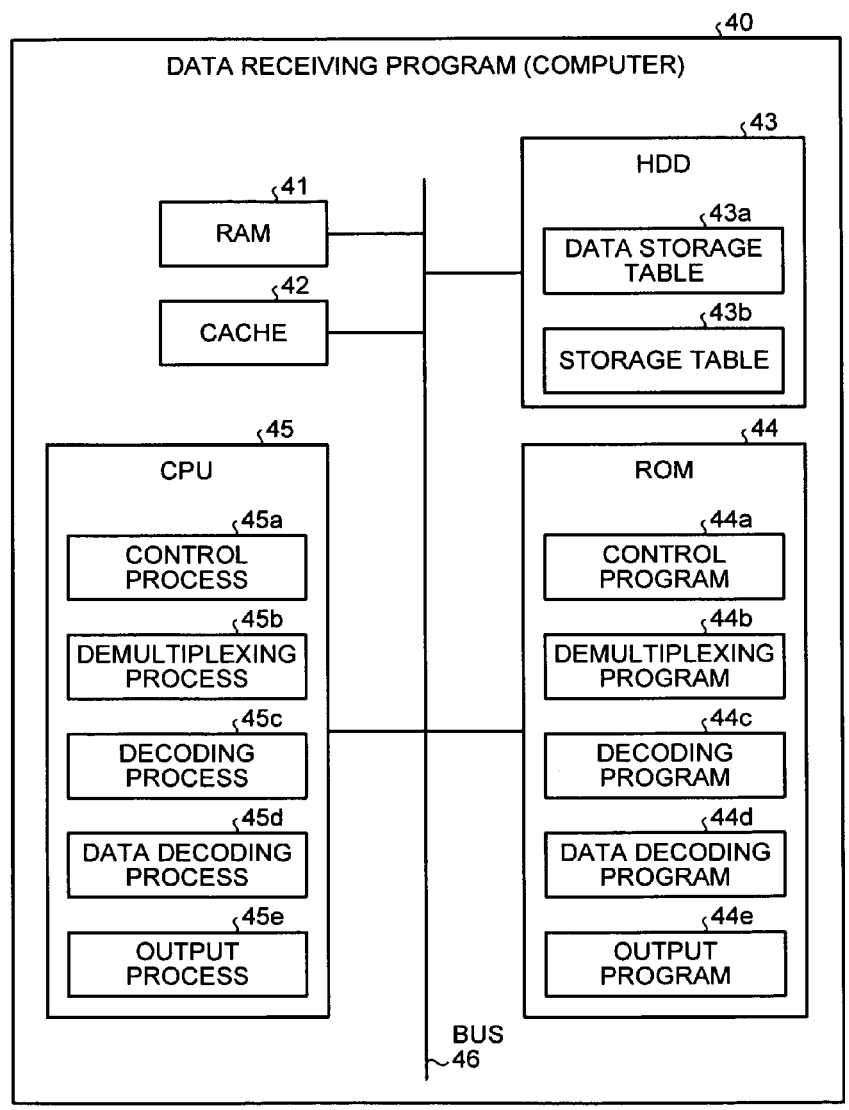
FIG. 15 is a diagram of a computer that executes a data receiving program.

Moreover, the various processes described in the above embodiments can be performed when a computer, such as a personal computer and a work station, executes a predetermined program. An example of a computer that executes a data transmitting program and an example of a computer that executes a data receiving program are described below with reference to FIGS. 14 and 15, the programs make the computers to have the same functions as those of the above embodiment. FIG. 14 is a diagram of a computer that executes the data transmitting program; FIG. 15 is a diagram of a computer that executes the data receiving program.

As illustrated in FIG. 14, a data transmitting program (computer) 30 includes a random access memory (RAM) 31, a cache 32, a hard disk drive (HDD) 33, a read only memory (ROM) 34, and a CPU 35, all of which being connected via a bus 36. It is noted that the ROM 34 stores therein a data transmitting program that causes the computer to have the same functions as those of the above embodiments, i.e., as illustrated in FIG. 14, a control program 34a, a section-information generating program 34b, a data-content generating program 34c, an encoding program 34d, and a multiplexing program 34e.

When the CPU 35 reads these programs 34a to 34e and executes them, as illustrated in FIG. 14, the programs 34a to 34e turn to a control process 35a, a section-information generating process 35b, a data-content generating process 35c, an encoding process 35d, and a multiplexing process 35e, respectively. It is noted that the processes 35a to 35e correspond to the units illustrated in FIG. 2, the control unit 11, the section-information generating unit 12, the data-content generating unit 13, the encoding unit 14, and the multiplexing unit 15, respectively.

The above programs 34a to 34e do not need to be present in the ROM 34; for example, they can be stored in a "portable physical medium" insertable into the computer 30, such as a flexible disk (FD), a compact disc-read only memory (CD-ROM), a magneto optical (MO) disk, a digital versatile disk (DVD), a magnetic optical disk, and an integrated circuit (IC) card, a "stationary physical medium" such as an internal or external hard disk drive (HDD) of the computer 30, or "another computer (or server)" that is connected to the computer 30 via the public line, the Internet, a local area network (LAN), a wide area network (WAN), or the like and the computer 30 reads the programs from the recording medium and executes them.

As illustrated in FIG. 15, a data receiving program (computer) 40 includes a RAM 41, a cache 42, an HDD 43, a ROM 44, and a CPU 45, all of which being connected via a bus 46. It is noted that the ROM 44 stores therein a data receiving program that causes the computer to have the same functions as those of the above embodiments, i.e., as illustrated in FIG. 15, a control program 44a, a demultiplexing program 44b, a decoding program 44c, a data decoding program 44d, and an output program 44e When the CPU 45 reads these programs 44a to 44e and executes them, as illustrated in FIG. 15, the programs 44a to 44e turn to a control process 45a, a demultiplexing process 45b, a decoding process 45c, a data decoding process 45d, and an output process 45e, respectively. It is noted that the processes 45a to 45e correspond to the units illustrated in FIG. 8, the control unit 21, the demultiplexing unit 22, the decoding unit 23, the data decoding unit 24, and the output unit 26, respectively.

The HDD 43 stores therein, as illustrated in FIG. 15, a data storage table 43a and a storage table 43b. The data storage table 43a and the storage table 43b correspond to the units illustrated in FIG. 8, the data storage unit 25 and the storage unit 27, respectively.

The above programs 44a to 44e do not need to be present in the ROM 44; for example, they can be stored in a "portable physical medium" insertable into the computer 40, such as a flexible disk (FD), a CD-ROM, an MO disk, a DVD disk, a magnetic optical disk, and an IC card, a "stationary physical medium" such as an internal or external hard disk drive (HDD) of the computer 40, or "another computer (or server)" that is connected to the computer 40 via the public line, the Internet, a LAN, a WAN, or the like and the computer 40 reads the programs from the recording medium and executes them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transmitting device for transmitting section information, a data broadcasting content included in a data carousel and including characters and an image, and a broadcasting content in a multiplexed manner, the data transmitting device comprising:
   a specified-information embedding unit that embeds specified information related to a specified image that is included in the broadcasting content into the section information by inserting the specified information as a Descriptor into an EIT (Event Information Table), the specified information being represented by characters;
   a multiplexing unit that multiplexes the section information embedded with the specified information by the specified-information embedding unit, the data broadcasting content, and the broadcasting content; and
   a transmitting unit that transmits data multiplexed by the multiplexing unit to a data receiving device.

2. The data transmitting device according to claim 1, further comprising a specified-information-content embedding unit that embeds a specified information content related to the specified image into the data broadcasting content, wherein an amount of the specified information content is larger than an amount of the specified information.

3. A data receiving device for receiving a stream in which section information, a data broadcasting content included in a data carousel and including characters and an image, and a broadcasting content are multiplexed and outputting the stream to an output unit, the data receiving device comprising:
   a detecting unit that detects whether output of a specified image that is included in the broadcasting content is avoided; and
   a specified-information output unit that searches for, when the detecting unit detects that output of the specified image is avoided, specified information embedded in the section information and outputs the found specified information to the output unit, the specified information being represented by characters and embedded in the section information as a Descriptor inserted into an EIT (Event Information Table).

4. The data receiving device according to claim 3, wherein, when the detecting unit detects that output of the specified image is avoided, the specified-information output unit searches for a specified information content embedded in the data broadcasting content and, if no specified information content is found, then searches for the specified information embedded in the section information and outputs the specified information to the output unit.

5. A data transmitting method for transmitting section information, a data broadcasting content included in a data carousel and including characters and an image, and a broadcasting content in a multiplexed manner, the data transmitting method comprising:

embedding specified information related to a specified image that is included in the broadcasting content into the section information by inserting the specified information as a Descriptor into an EIT (Event Information Table), the specified information being represented by characters;

multiplexing the section information embedded with the specified information, the data broadcasting content, and the broadcasting content; and transmitting data multiplexed at the multiplexing to a data receiving device.

6. The data transmitting method according to claim 5, the method further comprising embedding a specified information content related to the specified image into the data broadcasting content, wherein an amount of the specified information content is larger than an amount of the specified information.

7. A data receiving method for receiving a stream in which section information, a data broadcasting content included in a data carousel and including characters and an image, and a broadcasting content are multiplexed and outputting the stream to an output unit, the data receiving method comprising:

detecting whether output of a specified image that is included in the broadcasting content is avoided;

searching for, when it is detected that output of the specified image is avoided at the detecting, specified information embedded in the section information, the specified information being represented by characters and embedded in the section information as a Descriptor inserted into an EIT (Event Information Table); and outputting the found specified information to the output unit.

8. The data receiving method according to claim 7, wherein the searching includes searching for, when it is detected that output of the specified image is avoided at the detecting, a specified information content embedded in the data broadcasting content and, if no specified information content is found, then searching for the specified information embedded in the section information, and the outputting includes outputting the specified information to the output unit.

* * * * *

UNITED STATES PATENT AND TRADEMARK OFFICE
CERTIFICATE OF CORRECTION

| | |
|---|---|
| PATENT NO. | : 8,879,581 B2 |
| APPLICATION NO. | : 13/064636 |
| DATED | : November 4, 2014 |
| INVENTOR(S) | : Atsushi Ichiki et al. |

It is certified that error appears in the above-identified patent and that said Letters Patent is hereby corrected as shown below:

In the Specification

Column 1, line 4, delete "CROSS_REFERENCE" and insert -- CROSS-REFERENCE --, therefor.

Column 1, Line 9, delete "Incorporated" and insert -- incorporated --, therefor.

Signed and Sealed this
Fifth Day of May, 2015

Michelle K. Lee
*Director of the United States Patent and Trademark Office*